(12) United States Patent
Van Niekerk

(10) Patent No.: US 10,605,283 B2
(45) Date of Patent: Mar. 31, 2020

(54) METHOD FOR PRODUCING A COMPONENT CONNECTION AND COMPONENT CONNECTION PRODUCED ACCORDING TO THE METHOD

(71) Applicant: Bayerische Motoren Werke Aktiengesellschaft, Munich (DE)

(72) Inventor: Johann Van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 500 days.

(21) Appl. No.: 15/187,883

(22) Filed: Jun. 21, 2016

(65) Prior Publication Data

US 2016/0298666 A1 Oct. 13, 2016

Related U.S. Application Data

(63) Continuation of application No. PCT/EP2015/051297, filed on Jan. 23, 2015.

(30) Foreign Application Priority Data

Feb. 13, 2014 (DE) .................. 10 2014 202 631

(51) Int. Cl.
  *F16B 5/08* (2006.01)
  *F16B 35/06* (2006.01)
  (Continued)

(52) U.S. Cl.
  CPC ............... *F16B 5/08* (2013.01); *B23K 26/28* (2013.01); *F16B 35/06* (2013.01); *F16B 5/0664* (2013.01)

(58) Field of Classification Search
  CPC ............. B23K 26/28; F16B 5/08; F16B 35/06
  (Continued)

(56) References Cited

U.S. PATENT DOCUMENTS

| 3,188,731 A | 6/1965 | Sweeney |
| 4,924,063 A * | 5/1990 | Buchel ................ B23K 26/04 |
| | | 219/121.64 |

(Continued)

FOREIGN PATENT DOCUMENTS

| CN | 102149488 A | 8/2011 |
| DE | 296 21 207 U1 | 3/1997 |

(Continued)

OTHER PUBLICATIONS

Chinese Office Action issued in counterpart Chinese Application No. 201580002845.7 dated Jan. 20, 2017 with English-language translation (fourteen (14) pages).

(Continued)

*Primary Examiner* — Thien S Tran
(74) *Attorney, Agent, or Firm* — Crowell & Moring LLP

(57) ABSTRACT

A method for producing a component connection includes the steps of: providing a metal sheet; producing a through-hole in the metal sheet, wherein at least one rim portion or the entire peripheral rim of the through-hole is bent towards a side of the metal sheet, as a result of which at least one clamping collar-like element is created; providing an additional component, from which a spherical or spheroidal element projects; inserting the spherical or spheroidal element from the side of the metal sheet located opposite the at least one clamping collar-like element into the through-hole such that the spherical or spheroidal element at least partially projects from the through-hole on the side of the at least one clamping collarlike element. On the side of the at least one clamping collarlike element of the metal sheet, a welding seam surrounding the projecting part of the spherical or spheroidal element in a ring-like manner is generated, by way of which the spherical or spheroidal element, and thus the additional component is cohesively connected to the (Continued)

metal sheet, and/or wherein the additional component is adhesively bonded with the metal sheet.

13 Claims, 1 Drawing Sheet

(51) Int. Cl.
    *B23K 26/28*     (2014.01)
    *F16B 5/06*     (2006.01)

(58) Field of Classification Search
    USPC ..... 219/121.63, 121.64, 124.34; 411/81, 171
    See application file for complete search history.

(56) References Cited

U.S. PATENT DOCUMENTS

| | | | |
|---|---|---|---|
| 5,667,868 A | 9/1997 | Freeman | |
| 2004/0052574 A1* | 3/2004 | Grubb | B23K 26/28 |
| | | | 403/270 |
| 2004/0120788 A1* | 6/2004 | Ramasamy | B23K 9/207 |
| | | | 411/171 |
| 2011/0173797 A1 | 7/2011 | van Niekerk et al. | |
| 2013/0212858 A1 | 8/2013 | Herzinger et al. | |
| 2013/0269783 A1* | 10/2013 | Berg | C23C 14/0623 |
| | | | 136/264 |
| 2013/0269873 A1 | 10/2013 | Herzinger et al. | |
| 2014/0023456 A1* | 1/2014 | Allor | F41H 5/013 |
| | | | 411/396 |

FOREIGN PATENT DOCUMENTS

| | | | | |
|---|---|---|---|---|
| DE | 10 2010 028 322 A1 | 11/2011 | | |
| DE | 10 2010 041 356 A1 | 3/2012 | | |
| WO | WO 2012038012 A2 * | 3/2012 | | F16B 5/0642 |
| WO | WO 2012/084090 A2 | 6/2012 | | |

OTHER PUBLICATIONS

International Search Report (PCT/ISA/210) issued in PCT Application No. PCT/EP2015/051297 dated Apr. 16, 2015, with English translation (six (6) pages).

German-language Written Opinion (PCT/ISA/237) issued in PCT Application No. PCT/EP2015/051297 dated Apr. 16, 2015 (five (5) pages).

* cited by examiner

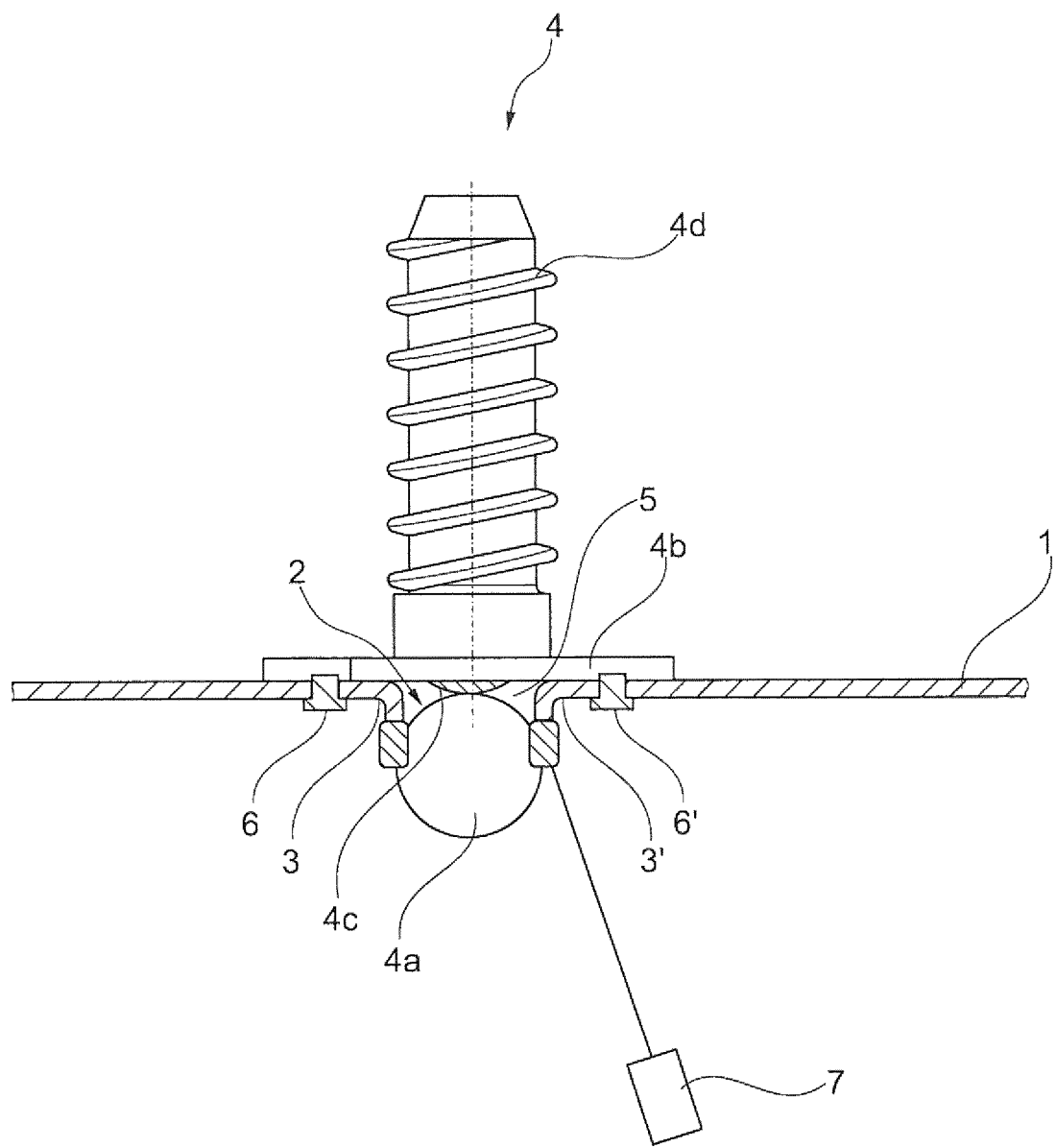

METHOD FOR PRODUCING A COMPONENT CONNECTION AND COMPONENT CONNECTION PRODUCED ACCORDING TO THE METHOD

CROSS REFERENCE TO RELATED APPLICATIONS

This application is a continuation of PCT International Application No. PCT/EP2015/051297, filed Jan. 23, 2015, which claims priority under 35 U.S.C. § 119 from German Patent Application No. 10 2014 202 631.8, filed Feb. 13, 2014, the entire disclosures of which are herein expressly incorporated by reference.

This application contains subject matter related to U.S. application Ser. No. 15/187,881, entitled "Method for Producing a Laser Weld Seam Between Components by Use of a Spherical or Sphere-Like Element, and Corresponding Component Connection" filed on Jun. 21, 2016.

BACKGROUND AND SUMMARY OF THE INVENTION

The present invention relates to a method for producing a component connection, as well as a correspondingly produced component connection.

DE 10 2010 028 322 A1 discloses a method for connecting a first vehicle component to a second vehicle component. Here, first of all the two vehicle components are detachably plugged together. To this end, a ball is attached to one of the two vehicle components, which ball is plugged in a clamping manner into a hole which is provided in the other vehicle component. After the two vehicle components are plugged together, they are welded.

It is an object of the invention to provide an improved method for producing a component connection, which method can be used in as versatile a manner as possible, in particular also for setting functional elements, and which method leads to a particularly high connection rigidity.

This and other objects are achieved by a method for producing a component connection, having the following steps: provision of a metal sheet; production of a through hole in the metal sheet, at least one edge section or the entire circumferential edge of the through hole being bent over toward one side of the metal sheet, which results in at least one clamping collar-like element; provision of a further component, from which a spherical or ball-like element projects; introduction of the spherical or ball-like element, from that side of the metal sheet which lies opposite the at least one clamping collar-like element, into the through hole in such a way that the spherical or ball-like element protrudes at least partially out of the through hole on the side of the at least one clamping collar-like element; producing a welded seam on the side of the at least one clamping collar-like element of the metal sheet and/or adhesively bonding the further component to the metal sheet, wherein the welded seam connects the at least one clamping collar-like element to the spherical or ball-like element and/or encloses the protruding part of the spherical or ball-like element in a ring-like manner, and via which welded seam the spherical or ball-like element and therefore the further component are connected to the metal sheet in an integrally joined manner.

A starting point of the invention is a method for producing a component connection, a through hole first of all being produced in a metal sheet. At least one edge section or the entire circumferential edge of the through hole is bent over or open toward one side of the metal sheet, which results in at least one clamping collar-like element.

Moreover, a further component is provided, from which a spherical or ball-like element projects. It can be provided that a section of the further component forms a functional element. The functional element can be, for example, a threaded bolt or a screw, a nut, or the like. The spherical or ball-like element can be welded onto one end of the functional element or can be connected thereto in a different way.

The spherical or ball-like element is introduced, from that side of the metal sheet which lies opposite the at least one clamping collar-like element, into the through hole in such a way that the spherical or ball-like element protrudes out of the through hole at least on the side of the at least one clamping collar-like element.

A core concept of the invention, in particular also in contrast to DE 10 2010 028 322 A1 which was mentioned at the outset, consists in that a welded seam is produced on the side of the at least one clamping collar-like element of the metal sheet, via which welded seam the at least one clamping collar-like element of the metal sheet is connected to the spherical or ball-like element, and/or a welded seam is produced which encloses that part of the spherical or ball-like element which protrudes out of the through hole in a ring-like manner. As a result, the spherical or ball-like element and therefore the further component are connected to the metal sheet in an integrally joined manner.

As an alternative or in addition to a welded connection of the spherical or ball-like element to the metal sheet or to the at least one clamping collar-like element of the metal sheet, it can be provided that the further component is adhesively bonded to the metal sheet.

The metal sheet and the spherical or ball-like element or the entire further component can consist of one and the same material, for example of steel, aluminum or an aluminum alloy. As an alternative to this, the metal sheet can also consist of a different material than the further component. It is contemplated, for example, that the metal sheet consists of steel and the further component consists of aluminum, or that the metal sheet consists of aluminum and the further component, in particular the spherical or ball-like element of the further component, consists of steel.

It is provided according to one development of the invention that the further component is adhesively bonded to the metal sheet in an undercut region which is present between the at least one clamping collar-like element and the spherical or ball-like element. If the undercut region between the "ball" and the clamping collar-like element or the clamping collar-like elements is filled with adhesive, a very high connecting strength can also be achieved by way of adhesive bonding.

Furthermore, the further element can be connected to the metal sheet in a fluidtight manner by way of the welded seam and/or the adhesive bond or the adhesive.

During the production of the welded seam, the at least one clamping collar-like element is melted and material of the at least one clamping collar-like element merges at least partially or completely into the welded seam. In particular, it can be provided that, during welding, material of the at least one clamping collar-like element flows into the undercut region which is situated between the ball or the ball-like element and the metal sheet and fills said undercut region preferably completely and possibly even over the entire circumference of the ball or the ball-like element. As a result, in addition to the integrally joined connection which is achieved by way of the welded connection, a positively locking connection is achieved, which results in a particularly high connecting strength.

It is provided according to one development of the invention that the welded seam is produced in such a way that the metal sheet merges all-round, that is to say over the entire circumference of the ball or the ball-like element, smoothly via the welded seam into the spherical or ball-like element.

The welded seam can be produced without contact by way of an electronically controlled welding apparatus which is arranged at a spacing from the spherical or ball-like element, in particular by use of a laser welding apparatus ("remote laser welding").

The position of the spherical or ball-like element in space and/or relative to the metal sheet can be detected in a contactless manner and from a distance from the spherical or ball-like element by use of an electronic measuring device, in particular by use of an opto-electronic measuring device.

The positional information which is provided by the measuring device can be fed to the welding apparatus and can be utilized to control the welding apparatus. In particular, the position of the center point of the spherical or ball-like element is helpful for controlling the welding apparatus, that is to say for producing a clean, closed welded seam which extends around the entire circumference of the spherical or ball-like element.

In particular in the case of a "true" ball, that is to say in the case of a spherical geometry, the positional determination of the center point of the ball is possible opto-electronically in a particularly simple way, that is to say with little outlay, in contrast to all other conceivable geometries. If the measuring device is oriented in such a way that a light beam which is emitted by the measuring device onto the spherical element is reflected totally, it is clear that the center point of the ball has to lie on an extension of said light beam. If the diameter of the ball is known, the position of the center point can therefore be determined very simply and precisely.

As has already been mentioned, it can be provided that a section of the further component is configured as a functional element, in particular as a pin-like functional element, from the one end side of which the spherical or ball-like element projects. Furthermore, it can be provided that a ring-like shoulder projects radially to the outside from the functional element, in a similar manner as is the case in a blind rivet. The shoulder can be used as a stop during the introduction of the further component into the through hole. If the further component is introduced into the through hole until the shoulder bears against the metal sheet on that side of the metal sheet which lies opposite the at least one clamping collar-like element, a defined relative position can be achieved in a simple way.

Furthermore, it can be provided that, after the introduction of the spherical or ball-like element into the through hole, the ring-like shoulder covers or conceals the through hole completely.

The ring-like shoulder of the further component can likewise be welded to the metal sheet. The shoulder can be welded to the metal sheet, in particular, via a circumferential or closed annular seam, which has the advantage that this then results in a fluidtight connection between the further component and the metal sheet. This welded seam can also be produced by means of the, or another, electronically controlled welding apparatus which is arranged at a spacing from the spherical or ball-like element, in particular by use of a laser welding apparatus.

Very generally, laser welding devices have the advantage that welded seams can be produced here precisely and with high quality even in the case of constricted installation space conditions, without it being necessary for the welding unit to be moved directly up to the component location to be welded.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 shows a component connection according to an embodiment of the invention.

DETAILED DESCRIPTION OF THE DRAWING

FIG. 1 shows a component connection which has a metal sheet 1, in which a through hole 2 is provided. Edge sections of the through hole are bent over toward the underside of the metal sheet 1, in the manner of clamping collar-like elements 3, 3'. A plurality of clamping collar-like elements of this type can be provided in the circumferential direction of the through hole 2. Relative to this, it can also be provided that the entire edge of the through hole is bent over or open downward and forms a closed clamping collar.

A spherical section 4a of a functional part 4 is plugged into the through hole 2 from an upper side of the metal sheet 1. Furthermore, the functional element 4 has a ring-like shoulder or a bearing plate 4b which bears against the metal sheet on the upper side of the metal sheet 1 and acts as a stop. The ball 4a can be connected to the shoulder 4b via a welded seam 4c. As can be seen from FIG. 1, the ball 4a protrudes out of the through hole 2. A threaded bolt 4d which acts as an actual functional element protrudes upward from the shoulder 4b.

During the production of the component connection which is shown in FIG. 1, first of all the functional element 4 is therefore plugged with its ball 4a into the through hole 2. The diameter of the ball 4a and the inside width of the opening which is formed by way of the clamping collar-like elements 3, 3' are therefore adapted to one another in such a way that the clamping collar-like elements 3, 3' bear against the ball 4a in a clamping manner from the outside. The functional element is therefore prefixed in a clamping manner by way of the clamping collar-like elements 3, 3' after being plugged in.

In a next step, the ball 4a is welded to the clamping collar-like element or elements 3, 3'. It can be provided that, during welding, liquid material of the clamping collar-like elements 3, 3' flows into the undercut region 5 which is situated between the ball 4a, the shoulder 4b and the metal sheet. It can be provided, in particular, that the entire undercut region is filled completely with liquid material. In this way, the ball 4a is welded to the metal sheet 1 in a particularly intimate and fixed manner.

In addition to this, the shoulder 4b can also be welded to the metal sheet via further welded points or circumferential welded points 6, 6' or via a circumferential welded seam, as a result of which an even higher connecting strength can be achieved.

The welding of the ball to the at least one clamping collar-like element 3, 3' and/or the welding of the ring-like shoulder 4b to the metal sheet 1 can take place via a laser welding apparatus 7 which is arranged at a distance from the welded locations. The precise position of the ball 4a or the position of the center point of the ball 4a and/or the relative position of the ball 4*a* in relation to the metal sheet 1 can be detected opto-electronically by means of a measuring device which is not shown here in greater detail. The positional data can be used directly for controlling the laser welding apparatus 7. In this way, very high quality welded seams can be produced in a fully automated manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component connection, the method comprising the acts of:
    providing a metal sheet;
    producing a through hole in the metal sheet, at least one edge section or the entire circumferential edge of the through hole being bent over toward one side of the metal sheet, which results in at least one clamping collar-like element;
    providing a further component, from which a spherical or ball-like element projects;
    introducing the spherical or ball-like element, from a side of the metal sheet which lies opposite the at least one clamping collar-like element, into the through hole such that a part of the spherical or ball-like element protrudes at least partially out of the through hole on the one side of the metal sheet with the at least one clamping collar-like element; and
    welding the at least one clamping collar-like element of the metal sheet to the spherical or ball-like element of the further component to connect the at least one clamping collar-like element to the spherical or ball-like element and to produce a welded seam on a side of the at least one clamping collar-like element of the metal sheet.

2. The method as claimed in claim 1, wherein the further component is connected to the metal sheet in a fluidtight manner by way of the welded seam.

3. The method as claimed in claim 1, wherein, during the welding, the at least one clamping collar-like element is melted and material of the at least one clamping collar-like element merges at least partially or completely into the welded seam.

4. The method as claimed in claim 1, wherein the welded seam is produced such that the metal sheet merges all-round smoothly via the welded seam into the spherical or ball-like element.

5. The method as claimed in claim 1, wherein the welded seam is produced without contact by use of an electronically controlled welding apparatus which is arranged at a spacing from the spherical or ball-like element.

6. The method as claimed in claim 5, wherein the apparatus is a laser welding apparatus.

7. The method as claimed in claim 1, wherein the further component has a pin-like functional element, from an end side of which the spherical or ball-like element projects.

8. The method as claimed in claim 7, wherein the spherical or ball-like element has been welded onto the end side of the functional element.

9. The method as claimed in claim 7, wherein the further component has a ring-shaped shoulder which projects radially to an outside from the functional element and wherein the ring-shaped shoulder of the further component is a separate component from the at least one clamping collar-like element of the metal sheet.

10. The method as claimed in claim 9, wherein, after the introduction of the spherical or ball-like element into the through hole, the ring-shaped shoulder covers the through hole and bears against the metal sheet on the side of the metal sheet which lies opposite the at least one clamping collar-like element.

11. The method as claimed in claim 10 further comprising the act of welding the ring-shaped shoulder of the further component to the metal sheet by an electronically controlled welding apparatus which is arranged at a spacing from the spherical or ball-like element.

12. The method as claimed in claim 9 further comprising the act of welding the ring-shaped shoulder of the further component to the metal sheet by an electronically controlled welding apparatus which is arranged at a spacing from the spherical or ball-like element.

13. A component connection produced according to the method of claim 1.

* * * * *